S. G. OGLESBY.
DIRIGIBLE HEADLIGHT.
APPLICATION FILED JAN. 18, 1915.
1,226,581.
Patented May 15, 1917.
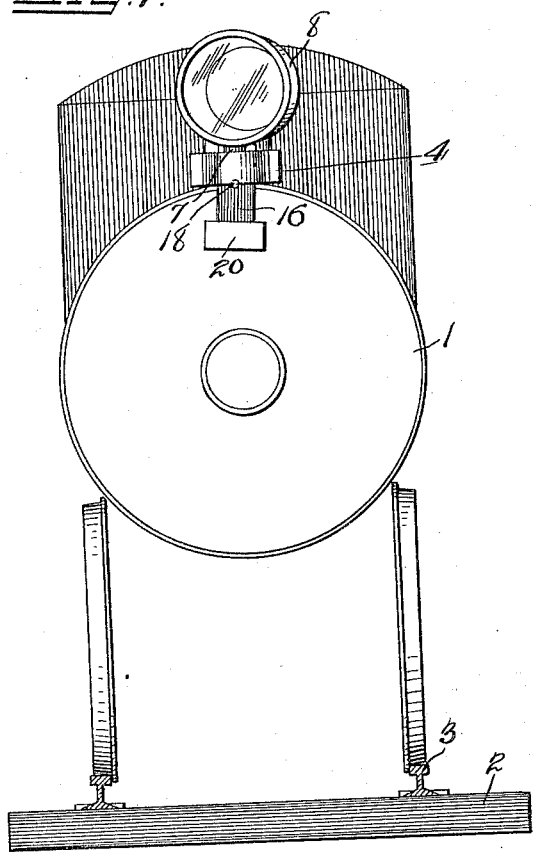
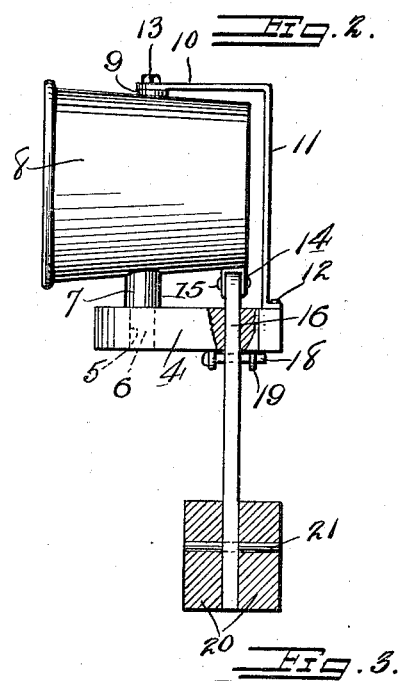
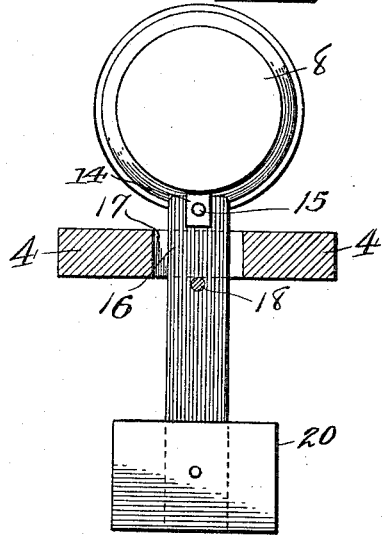
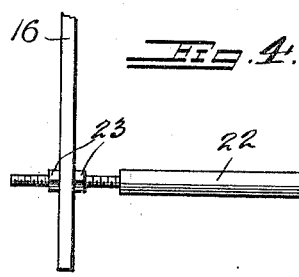
Witnesses
Edw. S. Hall.
Wm. Webster Downing.
Inventor
Sabert G. Oglesby.
By Richard B. Owen.
Attorney

UNITED STATES PATENT OFFICE.

SABERT G. OGLESBY, OF GREEN POND, ALABAMA.

DIRIGIBLE HEADLIGHT.

1,226,581.   Specification of Letters Patent.   Patented May 15, 1917.

Application filed January 18, 1915. Serial No. 2,955.

*To all whom it may concern:*

Be it known that I, SABERT G. OGLESBY, a citizen of the United States, residing at Green Pond, in the county of Bibb and State of Alabama, have invented certain new and useful Improvements in Dirigible Headlights, of which the following is a specification.

My invention relates to dirigible headlights.

The primary object of my invention resides in the provision of an improved headlight associated with a locomotive, automobile or other vehicle, the headlight also being so arranged that the rays projecting therefrom will assume a position directly in front of the vehicle when the vehicle is either turning or progressing in a straight path.

Another object of my invention resides in the provision of an improved headlight having novel means movably associated therewith and automatically actuated by movement of the locomotive or vehicle whereby an initial movement is imparted to the headlight.

A further object of my invention resides in the novel means for mounting the headlight and also in the novel means for associating the automatically operated controlling means, which, when applied in its preferred manner to a locomotive will, when the latter is rounding a curve, move about its pivot and direct its rays directly in the path of the track in front of the locomotive, this being due to the angular disposition of the track bed with respect to the ground.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:

Figure 1 is a front elevational view of a locomotive having my invention attached thereto, the locomotive being shown rounding a curve, the raised outer rail of the track at this point causing the locomotive to be arranged at a slight angle to the ground and also causing the angular movement of the pendulum and consequently the headlight;

Fig. 2 is an enlarged side elevational view of my invention, partly in section showing especially the means for associating the pendulum and complemental bar with the headlight;

Fig. 3 is a rear elevational view of my invention showing the supporting plate in transverse section; and Fig. 4 is a detail of the novel means for associating the device with the connecting rod of the steering mechanism of an automobile, the movement on the part of the latter consequently imparting a movement to the headlight.

Referring more particularly to the drawings in which similar reference numerals designate like or corresponding parts throughout the different views, I have in this instance shown my invention applied in its preferred manner, namely to a locomotive 1, the same being in this instance disposed on a curved portion of a track bed 2, the outer rail of which is raised, the raised rail consequently causing the locomotive to be displaced at a slight angle to the ground when passing over this portion of the track for a purpose to be hereinafter referred to. I desire to be understood that the locomotive and track bed perform no essential part of my invention, the same being shown merely for the purpose of clearly illustrating my invention.

Disposed on the forward end of the boiler of a locomotive and bracketed thereto in any suitable manner is a supporting plate 4, the latter being provided with an opening 5 adjacent the forward end thereof in which is disposed the reduced end 6 of a pivot 7. The pivot is preferably integrally formed with a headlight casing 8 and serves as a suitable means for affording a vehicle support as well as a rotary movement for the casing 8. Any suitable means of illumination may be disposed within the headlight casing. In order to further support the casing 8, I have disposed over the upper of the vertical pivots 9 of the casing 8, the angularly projecting portion 10 of the brace 11, the brace being preferably right angular in elevation and has its main portion arranged in closely spaced relation with the rear end of the casing 8, the free end of the brace being rigidly secured to the rear end of the plate by means of a suitable fastening device 12. A nut or like adjusting element 13 is removably disposed on the reduced end of the pivot 9 and serves as a suitable means for retaining the brace in position as well as preventing the accidental displacement of the casing therefrom.

In order to cause the rays of the headlight to be projected forwardly in the path of the locomotive and to at all times maintain the headlight in this position, I have pivotally connected between the spaced parallel ears 14, by means of a suitable fastening device 15, the upper rounded end of the bar 16. The bar is extended through a transversely arranged slot 17 disposed beneath the ears 14 in the plate 4, the bar being fulcrumed to the under surface of the plate by means of a bolt 18, the bolt passing through eyes 19 depending from the under surface of the plate, one of the eyes being engaged preparatory to the engagement with the bar. Secured to the lower or opposite end of the bar 14 is a suitable pendulum, which in this instance consists essentially of two sections 20, the sections being disposed on the respective sides of the bar and rigidly held thereon by means of a suitable fastening device 21 which extends through both of the sections as well as the bar. By this arrangement it will be understood that when the locomotive 1 is passing over a curved portion of a track, the raised outer rail of the track bed will slightly tilt the locomotive. During this movement the pendulum, being controlled by gravity, will seek its lowermost position, causing the bar to assume an inclined movement with respect to the plate 4 and consequently move the head light so that the rays will be directly in the path that the locomotive will assume.

In Fig. 4 I have shown a slightly modified form of means for controlling the movement of the bar 16. This form is used particularly when it is desired to associate my improved headlight with another form of vehicle, preferably an automobile. To accomplish this end, I provide a novel form of connecting rod 22 which in this instance consists of a body portion that is substantially circular in cross section, one end of which is reduced and screw threaded and extended, preferably through the opening that is used for receiving the fastening device 21 for securing the weight, which by the way has previously been removed. Adjusting nuts 23 are mounted upon the reduced screw threaded end of the connecting rod 22 upon opposite sides of the bar 14 and serve as a suitable means for clamping the improved form in position. The opposite end of the connecting rod 22 is split longitudinally, the portions thus formed having their terminals bent arcuately and constitute clamping arms 24 for removable engagement with the connecting rod 25 of the steering mechanism of an automobile, not shown. A bolt 26 serves as a suitable means for holding the parts in connection, said bolt being engaged by a nut 27 and serves as a suitable means for adjustably and removably holding the clamping arms about the rod 25.

The operation of my invention is as follows:

Assuming that the locomotive is traveling along a straight track, it is thought to be understood that the pendulum, due to the force of gravity will at all times assume a position perpendicular to the track and consequently maintain the headlight in a similar position, the slot 17 in the plate preventing unnecessary movement of the bar. When a curved portion of the track is reached, the locomotive will become slightly tilted because of the raised outer rail. During the movement of the locomotive the pendulum will naturally seek its lowermost position due to the force of gravity consequently imparting an angular movement to the bar 14, with respect to the plate, and also a corresponding movement to the headlight thus maintaining the headlight in a position so that the rays projecting therefrom will be arranged directly in the path of the locomotive.

Although I have shown and described the preferred embodiment of my invention I desire to be understood that I am not to be limited to the exact details shown, however, I desire that great stress be laid upon the arrangement of the novel means for mounting the headlight having a novel means movably associated therewith whereby an initial movement is imparted to the headlight due to the movement of the locomotive or vehicle to which it is associated, the said operating means being automatically actuated.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

What is claimed is:

1. A dirigible headlight including a supporting plate having a slot therein, a headlight rotatably mounted on the plate, a brace rigidly connected to the plate and associated with the headlight to facilitate the maintenance of the headlight in a vertical position, a pair of spaced ears integral with and depending from the headlight, a bar pivoted to the headlight between the ears and arranged through the slot and fulcrumed to the plate, and means associated with the lower end of the bar and controlled by movement of the vehicle for imparting a rotary movement to the headlight upon sidewise movement of the vehicle.

2. A dirigible headlight including a supporting plate having a slot therein, a headlight, vertical pivots projecting from the upper and lower surfaces of the headlight, the lower of which is rotatably associated with the plate, an angular brace having one end connected to the plate and the opposite end associated with the upper pivot for facilitating the supporting of the headlight, a pair of spaced ears integral with and depending from the headlight and positioned above the slot, a bar insertible through the slot and pivoted between the ears, a pin associated with the under surface of the plate for fulcruming the bar to the plate and a weight associated with the lower end of the bar for imparting a rotary movement to the headlight upon sidewise movement of the vehicle.

In testimony whereof I affix my signature in presence of two witnesses.

SABERT G. OGLESBY.

Witnesses:
 WILLIAM H. ELLIS,
 J. I. ELLIS.

Copies of this patent may be obtained for five cents each, by addressing the "Commissioner of Patents, Washington, D. C."